(12) United States Patent
Tracht et al.

(10) Patent No.: US 7,841,656 B2
(45) Date of Patent: Nov. 30, 2010

(54) VEHICLE SEAT ASSEMBLY WITH AIR BAG SEAM RUPTURING MEANS

(75) Inventors: Michael L. Tracht, Ingolstadt (DE); Rainer Penzel, Munich (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 12/697,426

(22) Filed: Feb. 1, 2010

(65) Prior Publication Data

US 2010/0133794 A1    Jun. 3, 2010

Related U.S. Application Data

(62) Division of application No. 11/858,982, filed on Sep. 21, 2007, now Pat. No. 7,654,612.

(30) Foreign Application Priority Data

Sep. 22, 2006    (DE) .................. 10 2006 044 935

(51) Int. Cl.
*B60N 2/42*    (2006.01)

(52) U.S. Cl. ................................. 297/216.13

(58) Field of Classification Search ............ 297/216.13, 297/216.14, DIG. 3, 452.41; 280/728.1
See application file for complete search history.

(56) References Cited

U.S. PATENT DOCUMENTS

| 5,492,360 A * | 2/1996 | Logeman ................. 280/728.3 |
| 6,502,858 B2 * | 1/2003 | Amamori ................. 280/743.2 |
| 7,093,854 B2 * | 8/2006 | Fischer et al. ............ 280/743.2 |

* cited by examiner

*Primary Examiner*—Milton Nelson, Jr.
(74) *Attorney, Agent, or Firm*—Brooks Kushman P.C.

(57) ABSTRACT

A vehicle seat assembly with a frame, a seat pad, and an air bag assembly housing an inflator and a folded air bag that is inflated by the inflator to unfold and project outwardly from the seat through the air bag release seam when the air bag seam is in an opened position. The vehicle seat assembly has an improvement comprising a tear strap secured to the frame and a second end portion secured to the release seam, a guide member through which the tear strap may slidingly pass; and a tether having a first stationary end secured to the frame and a second end that engages the guide member so that movement of the guide member is constrained thereby. The tear strap is movable in response to inflation of the air bag with sufficient force to rupture the release seam, thereby allowing the tear seam to open and allowing the air bag to pass therethrough.

16 Claims, 3 Drawing Sheets

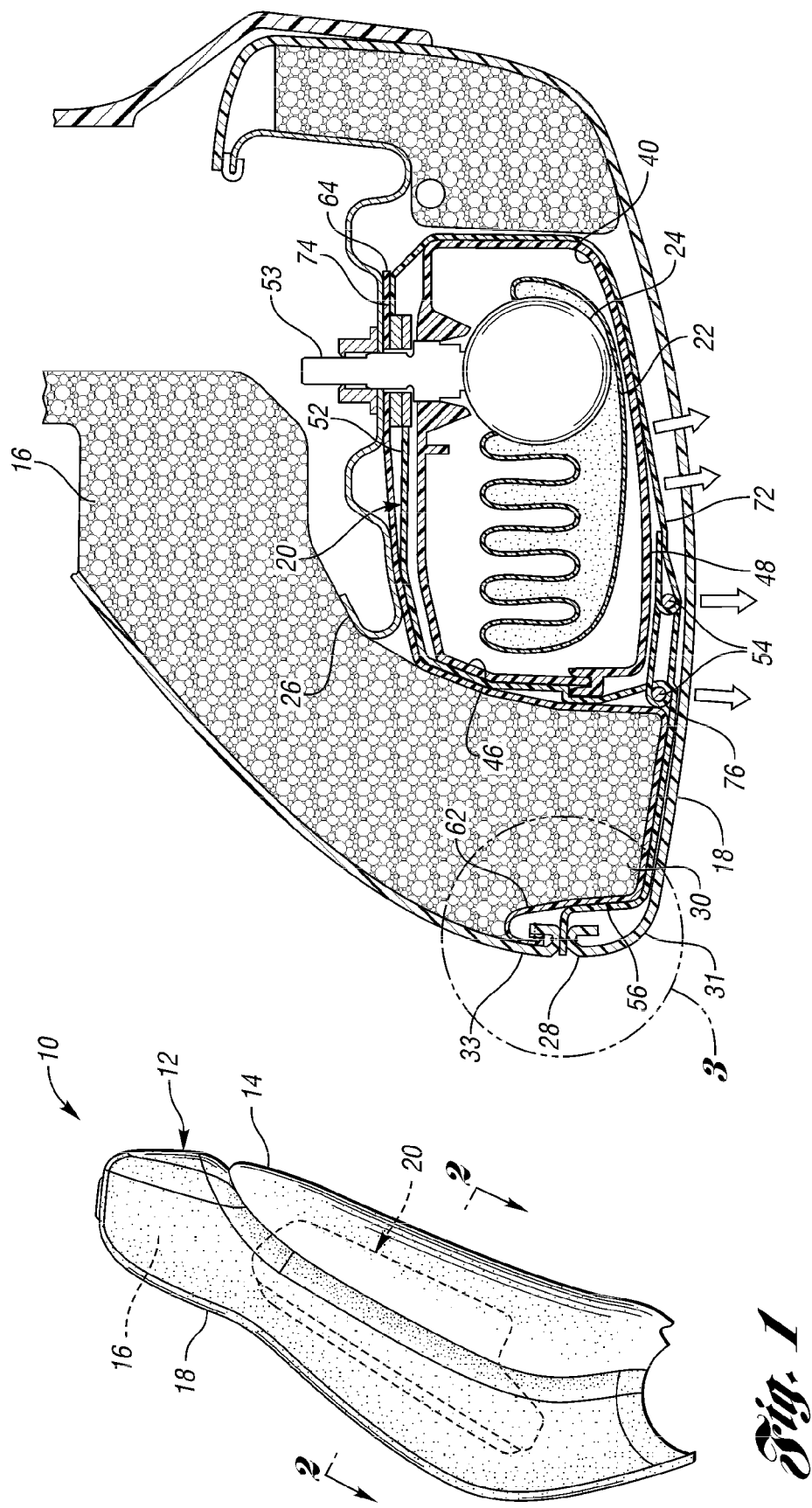

VEHICLE SEAT ASSEMBLY WITH AIR BAG SEAM RUPTURING MEANS

CROSS-REFERENCE TO RELATED APPLICATIONS

This application is a division of U.S. application Ser. No. 11/858,982 filed Sep. 21, 2007, now U.S. Pat. No. 7,654,612, which, in turn, claims priority to German Application No. 10 2006 044 935.5 filed on Sep. 22, 2006, the disclosures of which are hereby incorporated their entirety.

BACKGROUND OF THE INVENTION

1. Field of the Invention

The present invention relates to a vehicle seat assembly, and in particular, a seat assembly including an air bag. The seat assembly includes a tear seam which upon rupturing facilitates egress of the air bag during deployment.

2. Background Art

Vehicles and associated seating systems are designed to protect an occupant from injury after the vehicle sustains a hit having longitudinal and lateral force components. The side air bags offer protection from the adverse consequences of a blow having primarily a lateral component. Such devices may be in the form of a side air curtain disposed in a headliner of the vehicle, or an air bag disposed within a vehicle seat assembly. One limitation of air bags that are located within a seat assembly is that the air bag needs to break through the seating material before it can fully deploy to protect a vehicle occupant. During deployment, such an air bag may encounter foam, or other seat pad materials. It must then break through a seat trim cover in order to escape from the seat assembly.

Such encounters may impede or prohibit full, speedy deployment. Another limitation is that the air bag should break through the cover material at a predetermined location to optimize effectiveness.

Prior vehicle seat assemblies equipped with side air bags and manufacturing methods are disclosed in U.S. Pat. Nos. 5,816,610; 5,860,673; 5,938,232; 5,967,603; 6,045,151; 6,237,934; 6,299,197 and 6,588,838, for example.

SUMMARY OF THE INVENTION

The invention broadly includes a vehicle seat assembly that in at least one embodiment, has a frame, a seat pad adjacent the frame, and a trim cover extending over the seat pad. The trim cover includes a first and a second portion that together form a release seam. In one embodiment, a brace (such as stitching) extends between the first and second portions of the trim cover at the release seam to releasably secure the release seam in a first, closed position.

An air bag assembly is mounted on the frame within the trim cover in a spaced relationship from the air bag release seam. In accordance with this embodiment, the air bag assembly has a rigid or soft container and a lid that house an inflator and a folded air bag. In some cases, the container may effectively resemble a sack or a bag. Upon initiation, the bag unfolds and ultimately projects outwardly from the seat through the air bag release seam when the seam is in a second, opened position.

Preferably, a tear strap is provided that has a first stationary end portion that is secured (e.g., to a mounting stud, such as a nut and a bolt) that also secures the container of the air bag assembly in relation to the frame. At the other end of the tear strap is an a second end portion that is affixed to the release seam of the trim cover. In some embodiments, the tear strap passes around one side of the air bag assembly.

For reasons to be explained, a guide member is provided, through which the tear strap may slidingly pass.

Also secured for example to the mounting stud in some embodiments is a first stationary end of a tether. A second end of the tether engages the guide member so that movement of the guide member is constrained thereby. Preferably, the tether passes around the other side of the air bag assembly.

In operation, the tear strap is movable in response to inflation of the air bag with sufficient force to rupture the release seam. In this way, the tear seam may open and allow the air bag to pass therethrough.

BRIEF DESCRIPTION OF THE DRAWINGS

FIG. 1 is a fragmentary side view of a portion of a seat assembly in accordance with the present invention;

FIG. 2 is a fragmentary sectional view of the seat assembly shown in FIG. 1, taken through line 2-2;

DETAILED DESCRIPTION OF THE PREFERRED EMBODIMENT(S)

Figure 3:
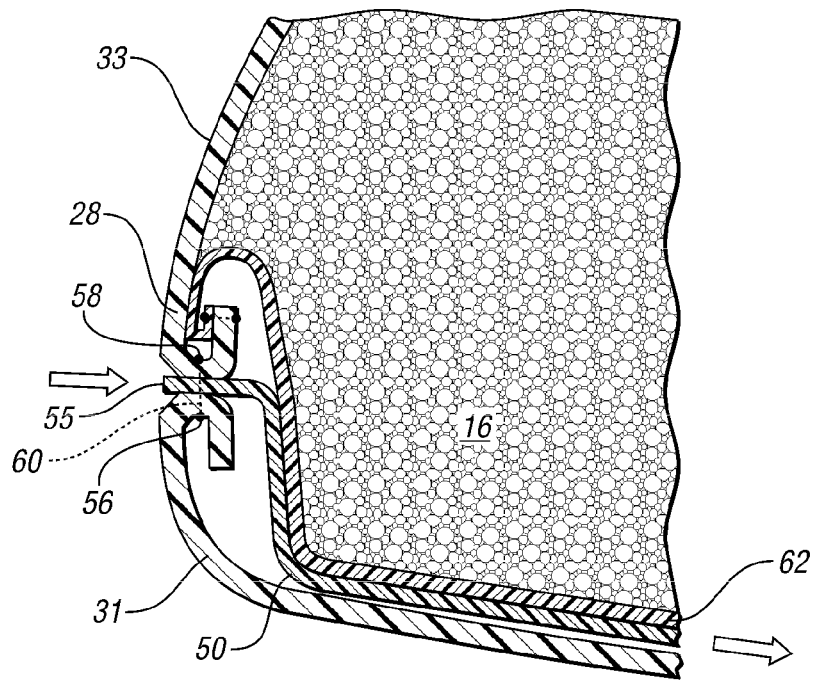
FIG. 3 is an enlarged view of a portion of FIG. 2.

As required, detailed embodiments of the present invention are disclosed herein. However, it is to be understood that the disclosed embodiments are merely exemplary of the invention that may be embodied in various alternative forms. The figures are not necessarily to scale. Some features may be exaggerated or minimized to show details of particular components. Therefore the specific structural and functional details disclosed herein are not to be interpreted as limiting, but merely as a representative basis for the claims and/or a representative basis for teaching one skilled in the art how to variously employ the present invention.

Moreover, except where otherwise expressly indicated, all numerical quantities in this description and in the claims indicating amounts of materials or conditions of reactions and/or use are to be understood as modified by the word "about" in describing the broader scope of this invention. Practice within the numerical limits stated is generally preferred. Also, unless expressly stated to the contrary, the description of a group or class of materials as suitable or preferred for a given purpose in connection with the invention implies that mixtures of any two or more members of the group or class may be equally suitable or preferred.

FIG. 1 shows a portion of a seat assembly 10 in accordance with the present invention. The seat assembly 10 includes a seat back 12 and seat pad 16 at least partially covered by a trim cover 18. As is well known, the seat assembly 16 includes a seat bottom (not shown). The trim cover 18 may be made of any suitable material such as cloth, vinyl or leather, etc. As is shown in FIG. 1, in at least some embodiments, a relatively rigid plastic molding 14 can be provided in the rear area of the seat assembly 10 to provide support and/or for aesthetics.

In at least one embodiment, the seat pad 16 is made from a molded polymeric material, such as a polyurethane foam. The use of a polymeric foam material to construct the seat pad 16 can be cost effective and can provide the flexibility needed to easily change the shape of the seat pad for different types of seat assemblies. Of course, other types of polymeric materials may be molded to form the seat pad 16.

Disposed within the seat back 12 is an air bag assembly, such as a side air bag assembly 20. While the side air bag assembly 20 is shown on the seat back 12, which is a usage for which it has particular utility, it is also possible for the side air bag assembly to be utilized with a seat bottom, even though the seat back usage is specifically disclosed. Also, as illustrated, the air bag assembly 20 is located at an outboard lateral side or extremity of the seat to provide protection against adjacent vehicle structure, but it is also possible to have the side air bag assembly located at the inboard lateral side to provide protection against an adjacent vehicle occupant and to also have side air bag assemblies at both outboard and inboard locations for protection in both lateral directions.

Referring now to FIG. 2, the air bag assembly 20 includes an air bag 22 and an inflator 24, which is configured to supply an inflation fluid such as gas to the air bag 22, thereby facilitating deployment of the air bag 22. In at least one embodiment, the air bag assembly 20 also includes a housing 40 which at least partially surrounds the air bag 22 and the inflator 24. In most embodiments, the housing 40 includes a container 46 secured to the seat frame 26 and a lid 48 that may open like a clam shell away from the container 46. It should be appreciated that neither the container 46 nor the lid 48 of the housing 40 need be formed from a rigid material. In some applications, in alternate embodiments, the container 46 and/or the lid 48 may be formed from a relatively soft material such as a woven or non-woven textile or a plastic sheet. In such cases, when the air bag is inflated, the forces of deployment will be exerted upon the tear strap 50 and tether 72. One consequence is that as the air bag travels outwardly beneath the trim cover 18, a sharp inwardly directed pull will be exerted upon and will lacerate the release seam 28.

Also shown in FIG. 2 is a portion of the seat frame 26 which can be used for mounting the seat assembly 10 to a vehicle. The seat pad 16 is disposed proximate the frame 26 and air bag assembly 20 and may be directly attached to the frame 26 at various points. The trim cover 18 includes an air bag release seam 28 (FIGS. 2-3) which in at least one embodiment is proximate to a side 30 of the seat pad 16.

In the embodiment shown in FIGS. 2-3, the trim cover 18 includes end portions 31, 33 that cooperate to form seam 28. Preferably, the end portions 31, 33 have one or more suitable connections or braces, shown schematically as stitching with ends 56 and 58, that cooperate to secure folded trim cover edges (such as one or more stitches) that comprise the seam 28. As also shown in the embodiment illustrated in FIG. 3, the ends 31 and 33 of cover 18 are connected to each other at seam 28 via any suitable connection member, such as stitching or thread or brace 60 that is shown schematically to help maintain seam 28 in a closed position before air bag deployment. While stitching 60 is shown schematically in FIG. 3, it should be understood that other connection members such as a breakable plastic, nylon, or fabric stitch or thread could be used.

The air bag assembly 20 is located within the trim cover 18 and may be conventionally mounted, such as on the frame 26 in a spaced relationship from the release seam. The schematically illustrated folded air bag 22, upon deployment, is inflated by inflation fluid from the inflator 24 to unfold and project outwardly from the seat 10, ultimately through the air bag release seam 28 of the trim cover 18.

Figure 4:
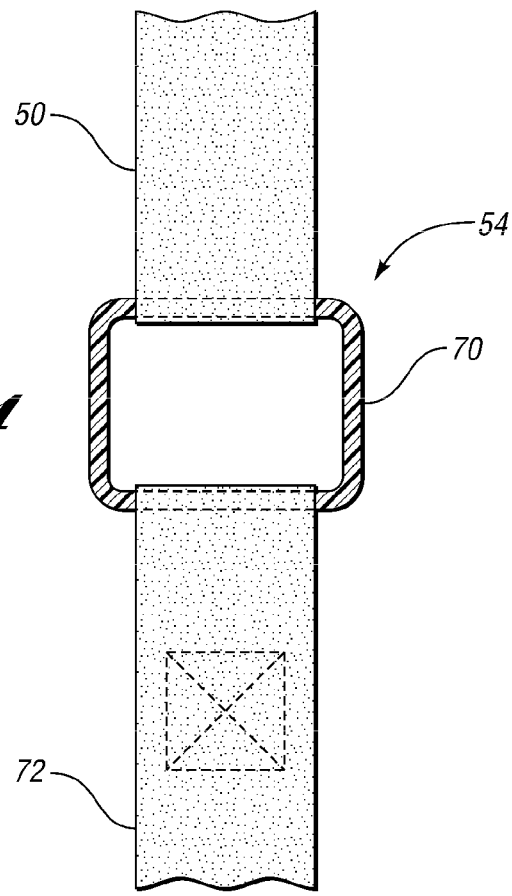
FIG. 4 is a rear elevation view of a guide member, a tear strap, and a tether before installation around the air bag assembly.

With continuing reference to FIGS. 2-4, a tear strap is generally indicated by 50 that is made of any suitable relatively inelastic material. The tear strap 50 has a first stationary end portion 52 that in some embodiments is secured to the bolt or fastener 53. Extending from the fastener 53, in one embodiment, the first stationary end 52 wraps along the container 46 of the housing 40 before passing through a guide member 54. In general, the guide member 54 can be thought of in alternate embodiments as a clasp that has a rectangular or curved rim. Several alternative embodiments are possible, including such devices as a carabiner, a ring, and the like.

In FIG. 4, one combination of a tear strap 50, a guide member 54, and a tether 72 is shown. These three members can be thought of as being members of a set. It will be appreciated that in a given application, there may be one or more of such sets that are provided.

After passing through the guide member 54, the tear strap extends along the outside of the seat pad 16 inside the trim cover 18 before terminating at a second end 55 that is secured to the release seam 28. In some embodiments, the tear strap may pass through the seat pad 16.

In the enlarged view of FIG. 3, the second end 55 of the tear strap 50 is shown as being attached between the ends 31, 33 of the trim cover 18.

The tether 72 has a first stationary end 74 that is secured, preferably to one or more fixed objects such as the frame 26, for example by an eyelet that circumscribes the bolt or fastener 53. It should be appreciated, however, that in some embodiments, a second end 76 of the tether 72 engages one limb 70 of the guide member 54 (FIGS. 2, 4). Since the tether 72 is relatively inelastic, movement of the guide member 54 is constrained. As illustrated, in some embodiments, the tether 74 passes around the lid 48 of the air bag assembly housing 40. It should be appreciated, however, that the positions of the tether 72 and tear strap 50 may usefully be interchanged in some embodiments, so that the tear strap 50 may pass around the lid 48, while the tether may pass around the container 46.

As the air bag deploys, the lid 48 of the housing 40 opens and moves outwardly or downwardly with reference to the cross-sectional view depicted in FIG. 2. It will be appreciated, of course, that such movement of the lid 48 in practice may result in outwardly directed displacement of the lid 40 when the air bag assembly 20 is situated in proximity to the lateral side edge of a seat back or seat cushion.

The position of the guide member 54 is determined by an inelastic length of the tether 72. In some embodiments, the first stationary ends 50, 74 of the tear strap 50 and tether 72 are secured by eyelets to the same bolt or fastener 53. Effectively, the tether 72 restricts movement of the guide member 54.

As noted above, when the air bag 22 deploys, the lid 48 moves outwardly, like a clam shell. The container 46 part of the housing 40 is immobilized by its attachment via the bolt or fastener 53 to the seat frame 26. Inward movement of the guide member 54 is constrained by the fixed length of the tether 72 that is wrapped around the outside of the lid 48. Outward movement of the clam shell lid 48 urges the guide member 54 (in relation to the frame of reference of FIG. 2) to move downwardly and outwardly. This action causes tension in the tear strap 50. Since the first stationary end 52 of the tear strap 50 is fixed, the tension induced in the tear strap 50 produces a sharp, inwardly directed pull in the center of the tear seam 28. Upon deployment of the air bag, the tear strap 50 will lacerate the release seam 28, thereby facilitating the bag's egress.

In some embodiments, an inner reinforcement strap or panel 62 is provided. One purpose of the panel 62 is to protect the foam of the seat pad 16 during deployment and thus avoid interference by foam debris to emergence of the air bag 22. One end 63 of the panel 62 is attached to the outside of one side, for example, 33 of the deployment seam 28, while a second end 64 (FIG. 2) of the reinforcement panel 62 is fixedly attached, for example, to the fastener 53 that secures the air bag assembly 20 to the seat frame 26.

One feature of the disclosed invention is that the tear strap 50 and the inner reinforcement panel 62 are disposed immediately adjacent each other inside the trim cover 18. Accordingly, the air bag 22 upon deployment extends along a path formed by the tear strap 50 or trim cover 18 on one side, and the inner reinforcement panel 62 on the other side.

Optionally, the inner reinforcement panel 62 may comprise woven or non-woven cloth material, which may include natural or synthetic materials such as nylon. One material that is found to be effective is a polyester material, of the type from which the air bag 22 may be manufactured. Regardless of the type of material used, the panel 62 can be helpful in reducing friction on the air bag 22 as it deploys. Although a polymer such as nylon may be particularly beneficial, even a fleece material will help reduce the friction on the air bag 22. This is because the panel 62 inhibits contact between the deploying air bag 22 and the seat pad 16 and helps to prevent small particles from separating from the seat pad and being introduced into the vehicle compartment.

Thus, the tear strap 50 extends between the middle of the seam 28 and the fastener 53. In at least one embodiment, the release tear strap 50 is movable in response to inflation of the air bag 22 with a sufficient force to break the brace 56,58 and allow the tear seam 28 to open. Thus, the air bag 22 can extend through the release seam 28 and outside the seat assembly 10 into an occupant protection position.

If the seam 28 is formed from continuous stitching that extends the length of the tear seam, the release tear strap 50 may only be connected to one or more threads of the stitching, since breaking one thread in a continuous stitching will allow the stitching to unravel, thereby allowing seam 28 to open.

The release tear strap 50 can be made by any suitable process and of any suitable material such as nylon, PP, and PE. In at least one embodiment, it is made of a somewhat flexible material such as a wire or band. In alternative embodiments, a portion of the release tear strap 50 may comprise of a string, band, wire, textile, mesh, tab, or a strap.

In at least one embodiment, the release tear strap 50 has a length of 1 to 100 cm (centimeters), in other embodiments of 5 to 100 cm, and in yet other embodiments of 15 to 50 cm. In at least one embodiment, the release tear strap 50 has a general thickness of 0.01 to 5 mm (millimeters), in other embodiments of 0.05 to 4 mm, and in yet other embodiments of 0.2 to 2.0 mm.

Also, in at least one embodiment, the inner reinforcement panel 62 prohibits all contact between the deploying air bag 22 and the seat pad 16. This can help to prevent energy loss by decreasing friction and protecting the seat pad 16 from damage. This, in turn, can also help to reduce the deployment time for the air bag 22 and/or the amount of inflation fluid required to deploy the air bag.

In FIG. 2, the tear strap 50 is illustrated as being installed between the container 46 of the side air bag assembly 20 and the frame 26. In this embodiment, the tether 72 passes around the outside of the lid 48. It will be appreciated that in alternate embodiments, the positions of the tear strap 50 and the tether 72 could be interchanged. In such embodiments, the tether 72 may pass around the container side of the side air bag assembly.

Further, the embodiment depicted in FIG. 2 suggests that the guide member 54 is not affixed to the side air bag assembly 20. In alternate embodiments, the guide member 54 may be desirably affixed to either the container or the lid side of the side assembly bag housing.

It should also be appreciated that the scope of the present invention is not limited to the position of the guide member 54 that is depicted in FIG. 2. In some embodiments, the tether 72 may be shortened such that the guide member 54 may lie further to the right (or rearwardly) in relation to the frame of reference in FIG. 2. Correspondingly, the length of the tether 72 might usefully be extended in some embodiments such that the guide member 54 may lie adjacent to or above a line at which the lid and the container intersect.

Figures 5, 6:
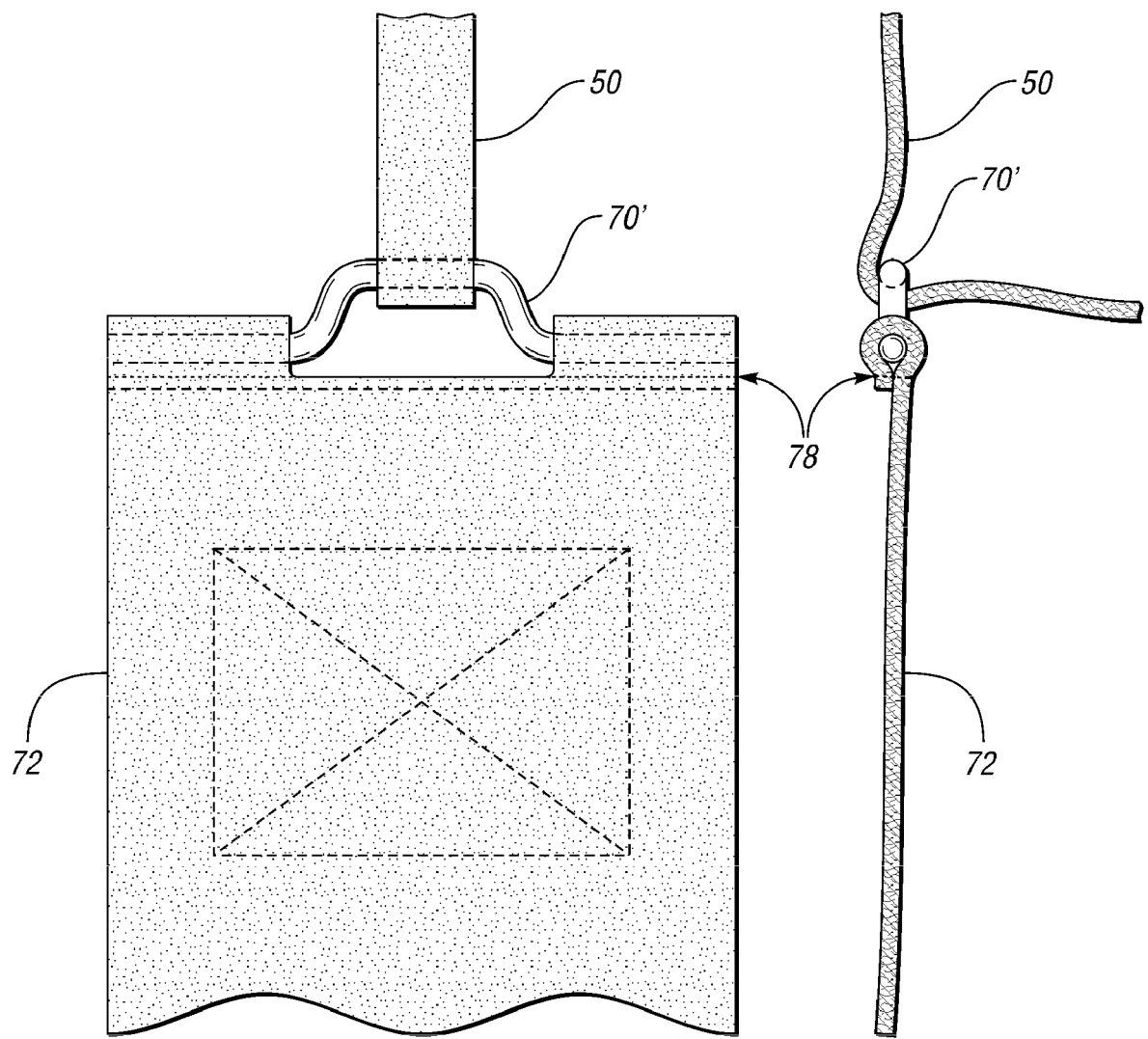
FIG. 5 is a rear elevation view of an alternate embodiment of the aspect of the invention that is depicted in FIG. 4.
FIG. 6 is a side view thereof.

Turning now to FIGS. 5-6, there is depicted an alternate embodiment of a guide member 70' which takes the form of a rod that is optionally bent in a central portion to form a handle that secures the tear strap 50. The handle 70' is secured to the tether 72 by any conventional means such as a portion of material that is bent back upon itself to form a hem that receives the handle 70'. A seam 78 in this embodiment is used preferentially to secure the bent over portion to the main body of the tether 72. It will be appreciated of course that alternate forms of attachment 78 may be used, such as riveting, fastening, gluing, welding, and the like.

As with other embodiments described herein, the positions of the tear strap 50 and tether 72 may for some applications be reversed.

It will also be appreciated that the term "guide member" as used herein generally includes a force-redirecting means such as a guide member having a quadrilateral shape (as depicted in FIG. 4), a carabiner, a handle such as that depicted in FIGS. 5-6, and a ring.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat assembly comprising a frame, a seat pad associated with the frame, a trim cover extending at least partially over the seat pad and including a first and a second end portion forming a release seam, a brace extending between the first and second portions of the trim cover at the release seam to maintain the release seam in a closed position before air bag deployment, an air bag assembly at least partially within the trim cover, the air bag assembly being in a spaced relationship from the air bag release seam, the air bag assembly housing an inflator and an air bag that is inflated by the inflator to unfold and project outwardly from the seat through the air bag release seam when the air bag seam is in an opened position:

a tear strap with a first stationary end portion and a second end portion secured to the release seam, the tear strap passing at least partially along at least a part of a first side of the air bag assembly between the air bag assembly and the frame;

a guide member through which the tear strap may slidingly pass; and a tether having a first stationary end and a second end that engages the guide member so that movement of the guide member is constrained thereby, the tether passing at least partially around another side of the air bag assembly, the tear strap being movable in response to inflation of the air bag with sufficient force to rupture the release seam, thereby allowing the tear seam to open and allow the air bag to pass therethrough.

2. The vehicle seat assembly of claim 1, wherein the tear strap passes around a side of the air bag assembly that is juxtaposed with the frame.

3. The vehicle seat assembly of claim 1, wherein the air bag assembly has an air bag container affixed to the frame and a lid that is pivotably attached to the container, the tether passing around the lid.

4. The vehicle seat assembly of claim 3, wherein the tear strap passes around the container.

5. The vehicle seat assembly of claim 4, wherein the tether passes around the lid.

6. The vehicle seat assembly of claim 1, wherein the guide member before air bag deployment lies outside the air bag assembly in proximity to the seat pad and beneath a portion of the trim cover.

7. The vehicle seat assembly of claim 1, further including an inner reinforcement panel, wherein an inner side of the trim cover and an outer side of the inner reinforcement panel form a passageway therebetween so that the air bag may pass therethrough en route to the release seam.

8. The vehicle seat assembly of claim 7, wherein the inner reinforcement panel is secured to one side of the release seam.

9. The vehicle seat assembly of claim 1, wherein the guide member comprises a force re-directing means selected from the group consisting of a guide member having a quadrilateral shape, a carabiner, a handle, and a ring.

10. The vehicle seat assembly of claim 1, wherein the release seam includes a brace, the brace being selected from the group consisting of continuous stitching, intermittent stitching, a plastic staple, ultrasonic welding and a glue.

11. The vehicle seat assembly of claim 1, wherein the tear strap comprises a member selected from the group consisting of a strap, a wire, a chord, a ribbon, and combinations thereof.

12. The vehicle seat assembly of claim 1, in which there are multiple tear straps, multiple guide members, and multiple tethers.

13. The vehicle seat assembly of claim 1, wherein the first stationary end of the tear strap is secured to the frame.

14. The vehicle seat assembly of claim 1, wherein the first stationary end of the tether is secured to the frame.

15. In a vehicle seat assembly having a seat pad associated with a frame, a trim cover extending over the seat pad and including a release seam, an air bag assembly at least partially within the trim cover, the air bag assembly being provided with a container and a lid, the container being secured to the frame so that the air bag assembly lies in a spaced relationship with the air bag release seam, the air bag assembly housing an inflator and a folded air bag that is inflated by the inflator to unfold and project outwardly from the seat through the air bag release seam when the air bag seam is in an opened position:
  a tear strap extending between the frame and the release seam, the tear strap passing around a first side of the air bag assembly;
  a guide member through which the tear strap may slidingly pass; and
  a tether secured between the frame and the guide member so that movement of the guide member is constrained thereby, the tether passing around a second side of the air bag assembly in relation to the side that engages the tear strap,
  the tear strap being movable in response to inflation of the air bag with sufficient force to lacerate the release seam, thereby allowing the seam to open and allow the air bag to pass therethrough,
  a method for deploying the air bag, comprising the steps of:
  inflating the air bag;
  tensioning the tear strap by outwardly directed forces of air bag deployment acting upon the tether; and
  lacerating the release seam by a sharp, inwardly directed tug exerted upon the release seam by tensioning forces applied to the tear strap by outward movement of the air bag in combination with the tether and the guide member.

16. A vehicle seat assembly comprising a frame, a seat pad associated with the frame, a trim cover extending at least partially over the seat pad and including a first and a second end portion forming a release seam, a brace extending between the first and second portions of the trim cover at the release seam to maintain the release seam in a closed position before air bag deployment, an air bag assembly at least partially within the trim cover, the air bag assembly being in a spaced relationship from the air bag release seam, the air bag assembly housing an inflator and an air bag that is inflated by the inflator to unfold and project outwardly from the seat through the air bag release seam when the air bag seam is in an opened position:
  a tear strap with a first stationary end portion and a second end portion secured to the release seam, the tear strap passing at least partially along at least a part of a first side of the air bag assembly between the air bag assembly and the frame;
  a guide member through which the tear strap may slidingly pass; and
  a tether having a first stationary end and a second end that engages the guide member so that movement of the guide member is constrained thereby, the tether passing at least partially around another side of the air bag assembly,
  the tear strap being movable in response to inflation of the air bag with sufficient force to rupture the release seam, thereby allowing the tear seam to open and allow the air bag to pass therethrough,
  the tear strap passing around a side of the air bag assembly that is juxtaposed with the frame.

* * * * *